United States Patent [19]

Neely, Jr.

[11] Patent Number: 5,308,033
[45] Date of Patent: May 3, 1994

[54] FLANGE MOUNTED ROUTING CLAMP

[75] Inventor: Robert H. Neely, Jr., Fort Wayne, Ind.

[73] Assignee: Navistar International Transportation Corp., Chicago, Ill.

[21] Appl. No.: 951,244

[22] Filed: Sep. 25, 1992

[51] Int. Cl.⁵ .............................................. F16L 3/08
[52] U.S. Cl. .................. 248/231.8; 248/68.1; 248/300
[58] Field of Search ............... 248/58, 68.1, 72, 74.2, 248/231.8, 300

[56] References Cited

U.S. PATENT DOCUMENTS

| | | | |
|---|---|---|---|
| 3,090,826 | 1/1960 | Cochran | 248/68.1 X |
| 3,193,229 | 7/1965 | Stock | 248/72 X |
| 3,599,916 | 8/1971 | Szabo | 248/231.8 X |
| 4,527,759 | 7/1985 | Dorner et al. | 248/74.2 X |

Primary Examiner—Richard K. Seidel
Assistant Examiner—Raymond D. Woods
Attorney, Agent, or Firm—Dennis K. Sullivan

[57] ABSTRACT

A routing clamp for attaching tubes, hoses, wire harnesses and the like to a vehicle frame comprises an elongate section of spring steel having a center portion and a flange engaging end which is bent back outwardly over the body portion to engage a frame rail flange of a vehicle, such as a truck, and to also engage the web portion of the frame rail. The other end of the section is folded inwardly to create a structure engaging loop within which the tubes, hoses or harnesses may rest. For convenience in opening the structure engaging loop, a terminal finger loop is provided.

2 Claims, 4 Drawing Sheets

FIG. 4
FIG. 5
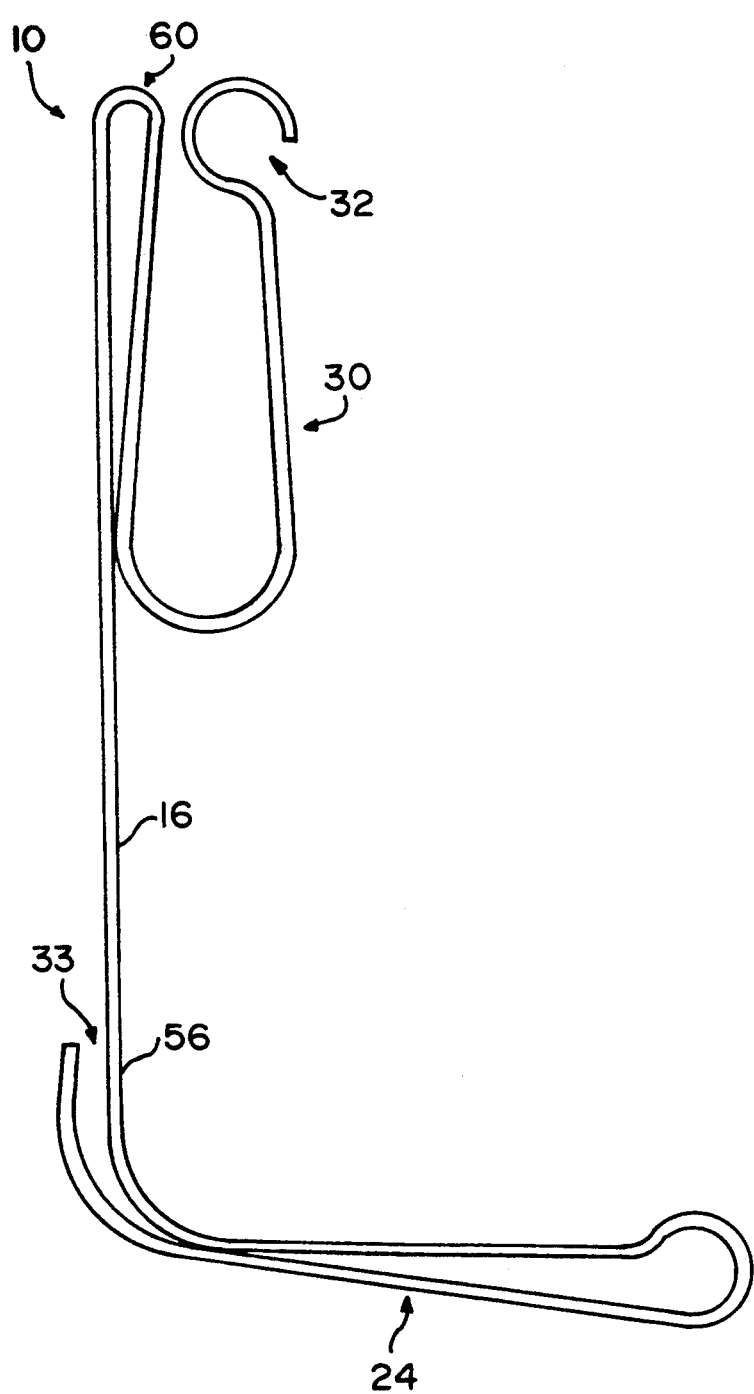
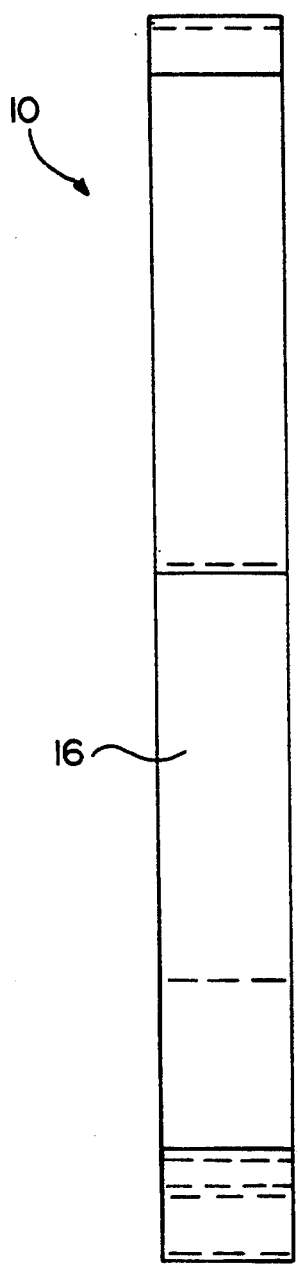

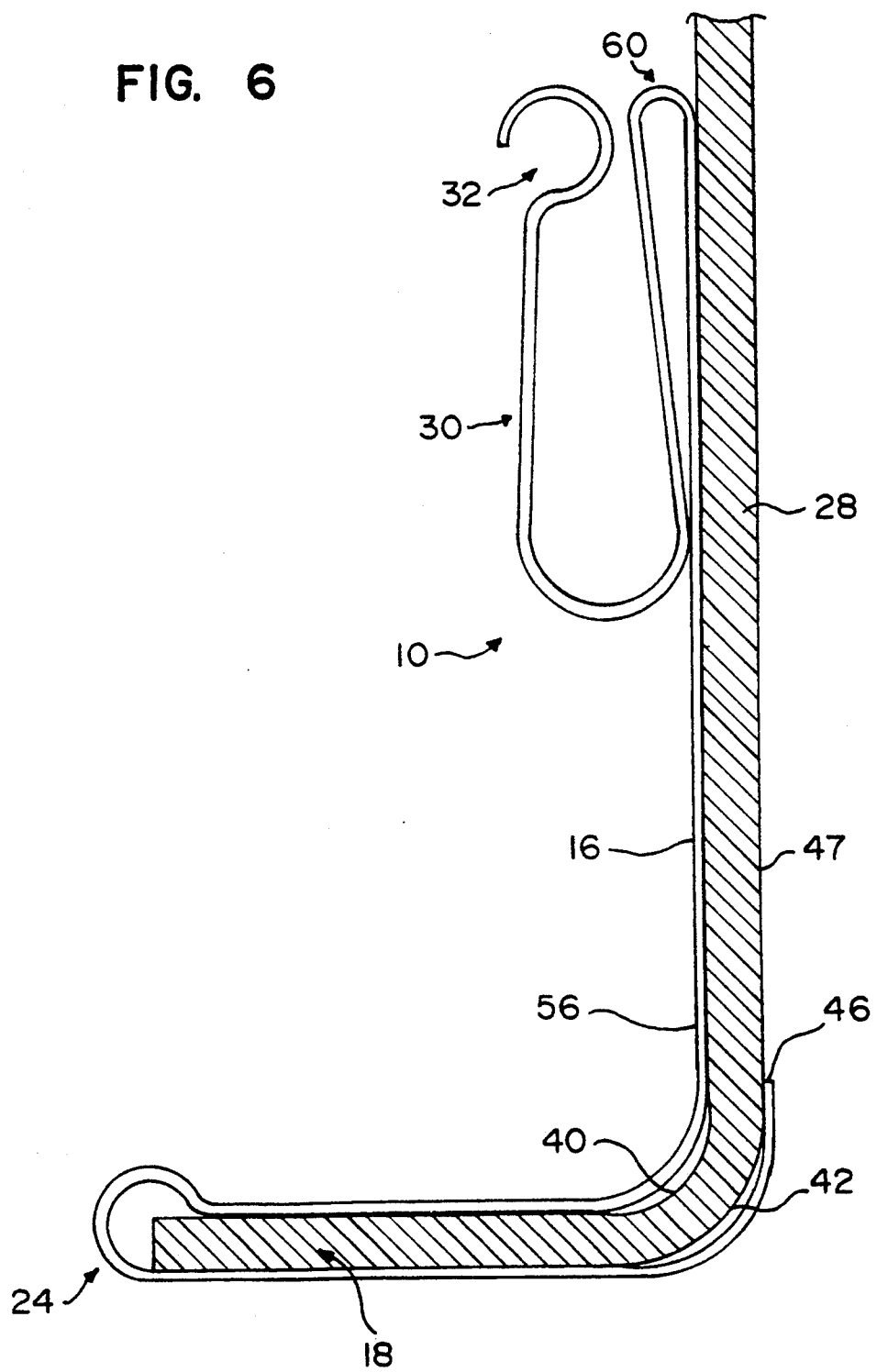

FLANGE MOUNTED ROUTING CLAMP

BACKGROUND OF THE INVENTION

The present invention relates to a routing clamp for hoses, wiring harnesses, tubes, etc. associated with an automotive vehicle, such as a truck. More specifically, the routing clamp is configured to be substantially self-mounting onto an upper or lower frame rail flange.

THE PRIOR ART

Heretofore, routing of hoses, harnesses, tubes and other elongated members along the frame of a truck chassis, for example, in the engine compartment thereof, has required a storehouse full of embodiments of clip extensions and clamps to accommodate the various routing configurations possible.

Further, use of such clip extensions and clamps has required drilling holes in the channel shaped side frame members, to which such clip extensions and clamps have been bolted, requiring a significant amount of labor. Moreover, drilling holes in certain areas of frame members may not be desirable from a structural standpoint.

As will be described in greater detail hereinafter, the flange mounted routing clamp of the present invention provides an extendable clamping structure which mounts to a flange of a frame rail without need to drill holes in the flange or to attach the clamp by means of bolts and nuts and which is freely positionable along the frame rail.

SUMMARY OF THE INVENTION

Accordingly, it is a primary object of the invention described and claimed herein to provide a labor saving clamp which is simply mounted to the vehicle frame rails.

A further object of the invention is to provide a generic clamp to reduce the need for stockpiles of various clamps or clips and extenders therefor.

A still further object of the invention is to provide a clamp which easily engages to an upper or lower flange of a frame rail of a vehicle.

A yet further object of the invention is to provide a clamp which can accommodate a variety of tubes, hoses, wiring harnesses, etc. disposed on a vehicle.

These and other objects are met by the flange mounted clamp of the present invention which comprises a spring steel clamp one end of which is configured to frictionally and mechanically engage a frame rail flange and the other end of which is provided with a U-shaped opening for receiving the elongated members to be engaged and held. The flange engaging end includes slot defining walls for receiving the flange of the frame rail, the walls having flange engaging portions and web engaging portions disposed perpendicularly and having arcuate joining portions having a larger radius of curvature than the frame rail to prevent interference at the juncture of the web and flange portions. The clamp thus hooks on the opposite side of the web from the flange to lock the clamp in place on the frame rail.

BRIEF DESCRIPTION OF THE DRAWINGS

Other objects and advantages of the invention will become more apparent upon perusal of the detailed description thereof and upon inspection of the drawings in which:

FIG. 4 is a side view of an alternative embodiment of the invention designed to engage a bottom flange of a frame rail;

FIG. 5 is a front view of the clamp of FIG. 4; and

FIG. 6 shows the clamp of FIGS. 4 and 5 engaged to and supported by a bottom flange of a frame rail.

DESCRIPTION OF THE PREFERRED EMBODIMENTS

Figure 1:
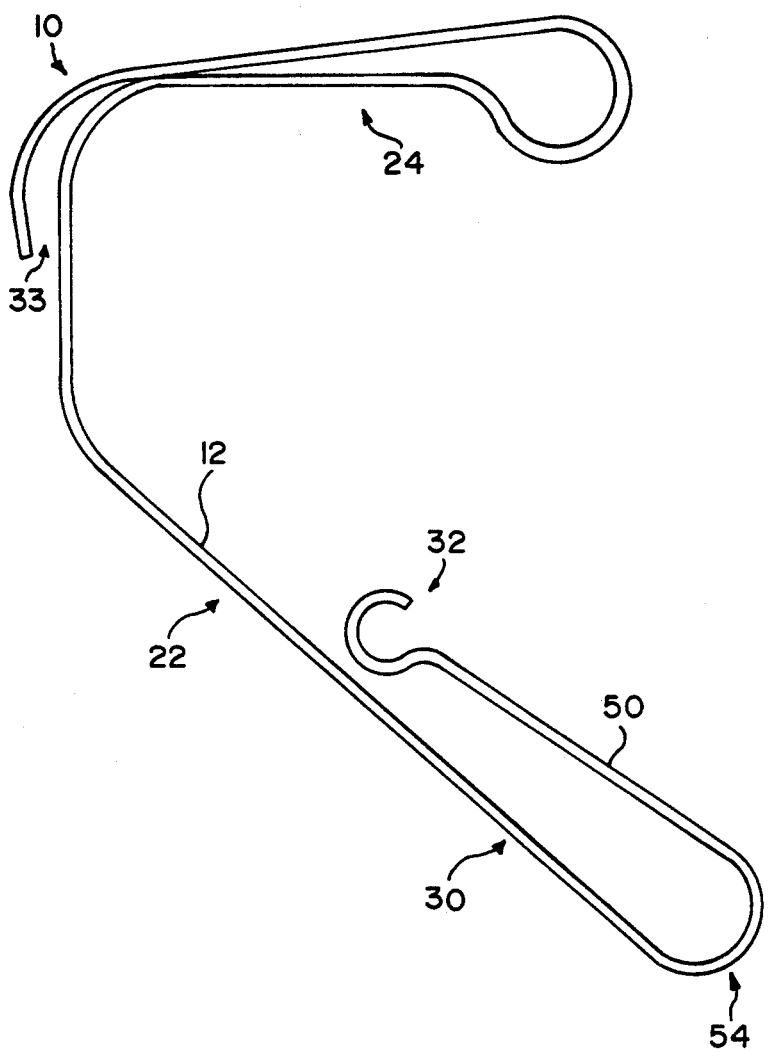
FIG. 1 is a side view of a clamp in accordance with the invention and designed to engage a top flange of a frame rail.

Referring now to the drawings in greater detail, there is shown in the drawings a clamp 10 made in accordance with the teachings of the invention.

Figure 2:
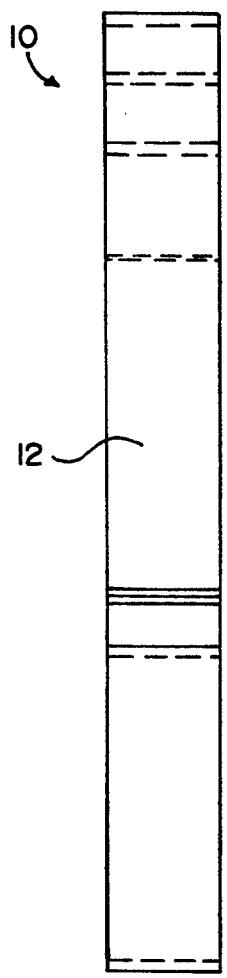
FIG. 2 is a front view of the clamp of FIG. 1.
Figure 3:
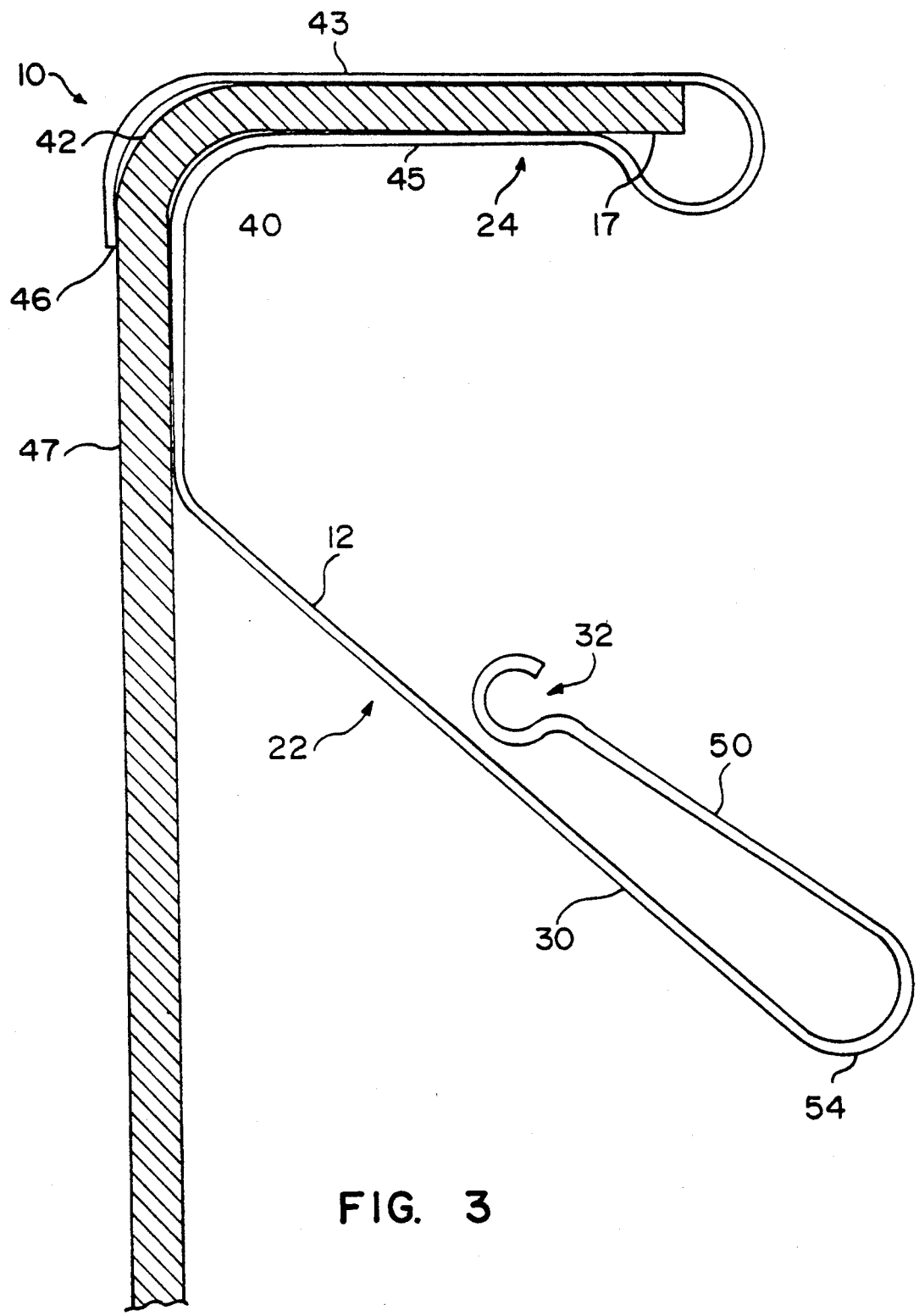
FIG. 3 shows the clamp of FIGS. 1 and 2 engaged to and supported by a top flange of a frame rail.

In FIGS. 1, 2, and 3, a first embodiment 12 of the clamp 10 configured for engagement to a top flange 17 of a vehicle frame rail 28 is illustrated, the frame rail being a C-shaped channel section opening toward the center of the vehicle chassis as is conventional although other sections having flanges are possible. FIGS. 4, 5, and 6 illustrate a second embodiment 16 of the clamp configured for engagement to a bottom flange 18 of the frame rail 28.

The clamp 12 illustrated in FIGS. 1-3 has a substantially C-shaped body portion 22 made of spring steel. An upper end 24 of the body portion 22 of the clamp 12 is configured to engage a top flange 17 of frame rail 28 while a lower end 30 of the clamp 12 has a generally upwardly opening U-shaped configuration to receive hoses, tubes, wiring harnesses, and other elongated members (not shown) which may extend along the frame rail 28, for example, within an engine compartment of the vehicle. It will be appreciated that a variety of configurations and locations of the lower end portion are possible. For example, a flexible locking bundling strap could be attached to the lower end 30 to more tightly contain the elongated members.

Turning to the end 24 of the clamp 12, which attaches to the frame rail flange 17, it will be seen that the clamp 12 folds back over itself in a radially outward direction, defining a slot 33 between the substantially parallel layers 43, 45 of material. This slot 33, when the layers 43, 45 are separated, has a shape similar to the shape of the flange 17 to which it is to be engaged.

The top flange 17 has a concave surface 40 and a convex surface 42. The convex inner layer 45 of body portion 22 of the clamp 12 has a larger radius of curvature than the concave surface 40, while the concave folded-over outer layer 43 of end portion 24 has a larger radius of curvature than the convex surface 42 but extends to a distal end 46 adjacent the flat web portion 47 of the channel section frame rail 28 which abuts the web and locks the clamp on to the frame rail. The larger radii of curvature prevent interference of the clamp in the arcute portion of the frame rail which might prevent the distal end 46 of the clamp 16 from abutting and locking onto the web portion 47.

The engagement created between the spring steel clamp 12 and the flange 17 is both frictional between the clamp layers 43 and 45 and mechanical by the distal end 46 hooking around to abut the web 47 on the side opposite the flanged side. Thus, after the end 24 of the body portion 22 springs into engagement about the flange 17, it clamps toward the body portion 22 and onto the flange 17. To further enhance frictional engagement, as well as provide protection of the hoses, tubes, or wiring harnesses, the clamp 12 may be provided with a coating of rubber.

The end 30 of the clamp 12 is configured to depend from an upper or top flange of the side member 28, thus positioning the body portion 22 of the clamp 12 within the engine compartment. As will be seen from the drawings, the body portion 22 is bent near a medial portion thereof and angles away from the frame rail 28 toward the U-shaped end portion 30. The outer portion of end 30 is rolled back to form an open loop 32, providing a fingerhold for assisting installation of the clamp 12.

Once the device 12 is mounted to the upper or top flange in a chosen position along the extent of the flange, a user engages the open loop 32 with a finger, flexing a second inwardly folded over portion 50 of the clamp 12 adjacent the end 30 away from the body portion 22. Then, any tubes, hoses, or wiring harnesses to be routed through the clamp 12 can be appropriately placed within the bend at 54, and the loop 32 may be released, frictionally engaging the structures within the end 30 of the device 12.

The second embodiment 16 shown in FIGS. 4-6 is designed to engage a lower or bottom side member flange 18. To maintain the elongated members to be held by the clamp 16 in position adjacent the frame rail 28, the clamp 16 is supported by bottom flange member 18, rather than depending therefrom. It will be understood that bottom flange 18 is a mirror image of the top flange 17 described above. Thus, the clamp 16 has a flange engaging end 24 which is substantially identical to that of the first embodiment 12 and engages the flange of the frame rail in substantially the same manner. However, this embodiment 16 has a substantially L-shaped body portion 56 to maintain the elongated member engaging end 30 in an upstanding position adjacent the web 47 of the frame rail. The elongated member engaging end 30 thus includes an extra fold therein at 60. Again the terminal end portion 32 is provided with an open loop 32 therein for use as a fingerhold.

As described above, the clamp 10 of the present invention has a number of advantages, some of which have been described above and others of which are inherent in the invention. Also, modifications may be proposed to the clamp 10 without departing from the teachings herein. For example, the body portion 56 of the clamp 16 might be bent to position the end 30 a predetermined distance from the frame rail 28. Accordingly, the scope of the invention is only to be limited as necessitated by the accompanying claims.

What is claimed is:

1. A clamp for suspending elongated members passing therethrough adjacent a frame rail of an automotive vehicle, said frame rail having a web portion, a flange portion disposed perpendicularly thereto on one side of said web portion, and an arcuate portion joining said web portion and said flange portion, comprising:

an elongated strip of resilient material having a first end integrally formed into a loop of sufficient size to receive said elongated members, and a second end integrally formed therewith, said second end being folded back over itself to define a slot disposed to engage said frame rail from the one side of said web portion, said second end including a web engaging portion disposed to engage an extended length of said web portion of said frame rail on said one side thereof, a flange engaging portion disposed to clampingly engage an extended length of said flange portion on opposite sides thereof, and a terminal portion disposed to engage an opposite side of said web portion from said one side at a location removed from said arcuate portion thereof.

2. The clamp of claim 1 wherein said loop is an open-ended loop formed by folding said first end back over itself, said first end terminating in a small finger engaging loop.

* * * * *